(12) United States Patent
Cha et al.

(10) Patent No.: US 12,164,602 B2
(45) Date of Patent: Dec. 10, 2024

(54) IMAGE ANALYSIS SYSTEM AND OPERATING METHOD OF THE SAME

(71) Applicant: Institute for Basic Science, Daejeon (KR)

(72) Inventors: Meeyoung Cha, Daejeon (KR); Sungwon Han, Seongnam-si (KR); Sungwon Park, Daejeon (KR); Sundong Kim, Daejeon (KR); Sungkyu Park, Seoul (KR)

(73) Assignee: INSTITUTE FOR BASIC SCIENCE, Daejeon (KR)

( * ) Notice: Subject to any disclaimer, the term of this patent is extended or adjusted under 35 U.S.C. 154(b) by 702 days.

(21) Appl. No.: 17/375,650

(22) Filed: Jul. 14, 2021

(65) Prior Publication Data

US 2022/0019846 A1 Jan. 20, 2022

(30) Foreign Application Priority Data

Jul. 17, 2020 (KR) .......................... 10-2020-0088732

(51) Int. Cl.
*G06V 10/32* (2022.01)
*G06F 18/2321* (2023.01)
*G06F 18/2431* (2023.01)

(52) U.S. Cl.
CPC ...... *G06F 18/2321* (2023.01); *G06F 18/2431* (2023.01); *G06V 10/32* (2022.01)

(58) Field of Classification Search
CPC ............... G06F 18/232; G06F 18/2325; G06F 18/2337; G06F 18/24; G06F 18/2431;
(Continued)

(56) References Cited

U.S. PATENT DOCUMENTS

| 8,861,805 B2 | 10/2014 | Hwang et al. |
| 11,449,733 B2 | 9/2022 | Kim et al. |
| 2021/0264300 A1* | 8/2021 | Staudinger ........... G06V 10/762 |

FOREIGN PATENT DOCUMENTS

| KR | 10-2013-0048076 A | 5/2013 |
| KR | 10-2019-0028235 A | 3/2019 |
| KR | 10-2020-0071865 A | 6/2020 |

OTHER PUBLICATIONS

Yan et al. "Image clustering via deep embedded dimensionality reduction and probability-based triplet loss." IEEE Transactions on Image Processing 29 (2020): 5652-5661 (Year: 2020).*

(Continued)

*Primary Examiner* — Sumati Lefkowitz
*Assistant Examiner* — Michael Adam Shariff
(74) *Attorney, Agent, or Firm* — Harness, Dickey & Pierce, P.L.C.

(57) ABSTRACT

Disclosed is an image analysis system which includes a first analyzer and a second analyzer. The first analyzer generates first features by encoding images through a first model and adjusts a weight of the first model based on the first features. The second analyzer generates second features based on the first features by encoding the images through a second model, classifies the second features into classes, respectively, and adjusts a weight of the second model based on mutual information and a correlation between a first class among the classes which features corresponding to an original image group from among the second features are classified as and a second class among the classes which features corresponding to an augmentation group of the original image group from among the second features are classified as.

15 Claims, 8 Drawing Sheets

(58) Field of Classification Search
CPC .... G06F 18/243; G06V 10/762; G06V 10/32; G06V 10/764; G06V 10/454; G06V 10/70; G06V 10/82; G06T 5/60; G06T 5/00; G06T 2207/20081; G06T 2207/20084; G06N 3/02; G06N 3/045; G06N 3/0464; G06N 20/00; G06N 3/088
See application file for complete search history.

(56) References Cited

OTHER PUBLICATIONS

Guo et al. "Adaptive self-paced deep clustering with data augmentation." IEEE Transactions on Knowledge and Data Engineering 32.9 (2019): 1680-1693 (Year: 2019).*
Embedding matters: A novel two-stage unsupervised image classification, Anonymous CVPR submission, 2020.
Xu Ji et al., Invariant Information Clustering for Unsupervised Image Classification and Segmentation, 2019.
Ng Wu et al., Unsupervised Feature Learning via Non-Parametric Instance Discrimination, 2018.
Jiabo Huang et al., Unsupervised Deep Learning by Neighbourhood Discovery, 2019.

\* cited by examiner

IMAGE ANALYSIS SYSTEM AND OPERATING METHOD OF THE SAME

CROSS-REFERENCE TO RELATED APPLICATIONS

This application claims priority under 35 U.S.C. § 119 to Korean Patent Application No. 10-2020-0088732 filed on Jul. 17, 2020, in the Korean Intellectual Property Office, the disclosures of which are incorporated by reference herein in their entireties.

BACKGROUND

Embodiments of the present disclosure described herein relate to an image analysis system and an operating method thereof, and more particularly, relate to a deep learning-based image analysis system and an operating method thereof.

Deep learning-based algorithms have brought notable development in various computer vision tasks. However, deep learning models may require active supervision of quality labels. In contrast, unsupervised learning may not require a lot of costs in collecting labels, thus having scalability.

Clustering is one of key tasks for the unsupervised learning. A goal of the clustering is to classify data as a class sharing the same attributes. Because image data for image clustering are high-dimensional data, a task to reduce data to smaller dimensional data (i.e., embedding) may be as important as to identify a boundary of a cluster group. An image analysis system may classify an object through image clustering. As such, there is required a technology for improving the accuracy of analyzing image data.

SUMMARY

Embodiments of the present disclosure provide an image analysis system capable of improving the accuracy of object classification and an operating method thereof.

According to an embodiment, an image analysis system includes a first analyzer and a second analyzer. The first analyzer generates first features by encoding images through a first model and adjusts a weight of the first model based on the first features. The second analyzer generates second features based on the first features by encoding the images through a second model, classifies the second features into classes, respectively, and adjusts a weight of the second model based on mutual information and a correlation between a first class among the classes which features corresponding to an original image group from among the second features are classified as and a second class among the classes which features corresponding to an augmentation group of the original image group from among the second features are classified as.

As an example, the first analyzer may group a feature being the closest in value to a target feature from among the first features based on the first model whose weight is adjusted. The first analyzer may transform the feature being the closest in value to the target feature so as to be close in distance to the target feature in an embedding space. As an example, the first analyzer may generate the first features by extracting features from the images, reducing a dimension of the features to a given dimension, and normalizing the dimension-reduced features to an embedding space.

As an example, the first analyzer may calculate a first probability that a feature being the most neighboring to a target feature from among the first features is classified as a sub-class and a second probability that the target feature is absent from the sub-class, based on a similarity between features corresponding to the original image group from among the first features and features corresponding to the augmentation group from among the first features, and may adjust the weight of the first model based on the first probability and the second probability.

As an example, the second analyzer may transform a feature being the most neighboring in value to a target feature from among the second features based on the second model whose weight is adjusted, so as to be close in distance to the target feature, and may classify the transformed features into the classes. As an example, the second analyzer decides an initial value for calculating the second features based on the first features. As an example, the second analyzer may generate the second features by extracting features from the images, reducing a dimension of the features to a given dimension, and normalizing the dimension-reduced features to an embedding space based on the first features.

As an example, the second analyzer may calculate a first probability variable of the first class and a second probability variable of the second class, may calculate a clustering loss based on a joint probability distribution between the first and second probability variables, and may adjust the weight of the second model based on the clustering loss such that the mutual information increases. As an example, the second analyzer may calculate a first probability that a target feature among the features corresponding to the augmentation group is classified as a target class and a second probability that a feature corresponding to the target feature from among the features corresponding to the original image group is not classified as the target class, and may adjust the weight of the second model based on the first probability and the second probability. As an example, the second analyzer may calculate a first loss based on the mutual information, may calculate a second loss based on the correlation, and may adjust the weight of the second model such that a sum of the first loss and the second loss to which a weight is given.

As an example, a label is not given to the images.

According to an embodiment, an operating method of an image analysis system includes generating first features by encoding original images through a first model, generating second features by encoding augmentation images of the original images through the first model, adjusting a weight of the first model based on the first features and the second features, generating third features by encoding the original images through a second model based on the first features, generate fourth features by encoding the augmentation images through the second model based on the second features, clustering the third and fourth features, and adjusting a weight of the second model based on mutual information and a correlation between the third and fourth features thus clustered.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described clearly and in detail with reference to accompanying drawings to such an extent that an ordinary one in the art implements embodiments of the present disclosure.

Figure 1:
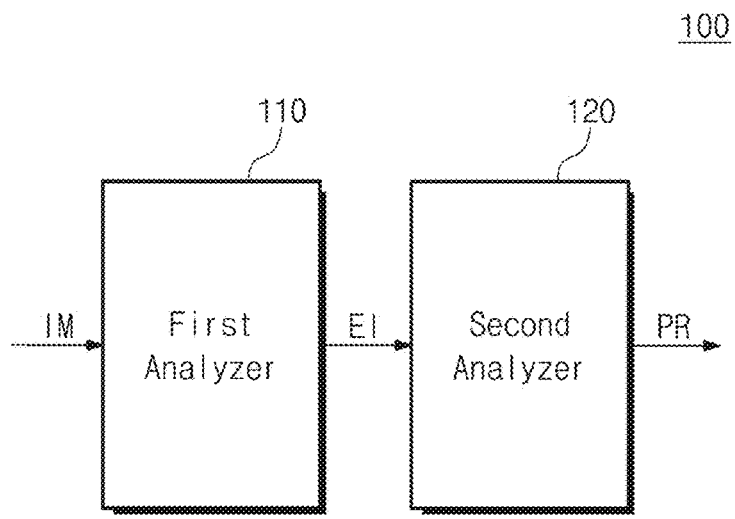
FIG. 1 is a block diagram of an image analysis system according to an embodiment of the present disclosure.

FIG. 1 is a block diagram of an image analysis system according to an embodiment of the present disclosure. Referring to FIG. 1, an image analysis system 100 may a first analyzer 110 and a second analyzer 120. The image analysis system 100 may analyze images IM and may generate a classification result PR of objects included in the images IM.

The first analyzer 110 may perform pretraining on the images IM and may generate encoded information EI being initialization information for image classification. The first analyzer 110 extracts features from the images IM and generates the encoded information EI about the features through embedding. The first analyzer 110 may extract the features from the images IM in an unsupervised manner without using a label annotated by a user. The first analyzer 110 may generate the encoded information EI of the features such that similar features are placed close to each other in an embedding space. The first analyzer 110 may train a first model for generating the encoded information EI from the images IM and may generate the encoded information EI based on the first model thus trained. The first analyzer 110 will be more fully described later.

The second analyzer 120 performs embedding and clustering on the encoded information EI to generate the classification result PR of the features. The second analyzer 120 may regard the encoded information EI as the initialization information to perform embedding and clustering together. The second analyzer 120 may allow similar features to be placed closer to each other in an embedding space through the embedding of features and may classify the features in the unsupervised manner. The second analyzer 120 may train a second model for performing embedding and clustering on the encoded information EI together and may generate the classification result PR based on the second model thus trained. The second analyzer 120 will be more fully described later.

However, the present disclosure is not limited thereto. For example, in the case of extracting and classifying features from the images IM by using a small number of labels, the first analyzer 110 and the second analyzer 120 may use a pre-trained model in a semi-supervised manner. As a result, the performance of classification may be improved.

Figure 2:
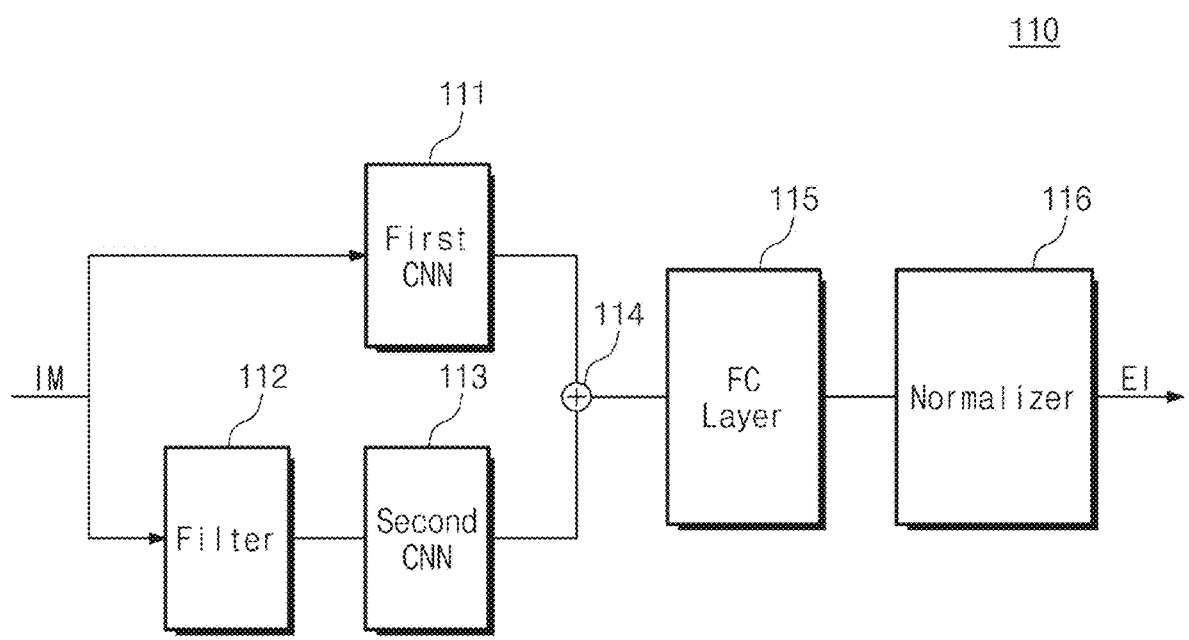
FIG. 2 is a diagram of a first analyzer of FIG. 1.

FIG. 2 is a diagram of a first analyzer of FIG. 1. Referring to FIG. 2, the first analyzer 110 may be implemented with a first convolution neural network (CNN) 111, a filter 112, a second CNN 113, a merger 114, a fully-connected (FC) layer 115, and a normalizer 116. The components illustrated in FIG. 2 may be implemented with a first model of a super-AND (Anchor Neighbourhood Discovery) manner. However, the present disclosure is not limited thereto. For example, the first analyzer 110 may perform pretraining on the images IM in an embedding manner (e.g., an AND manner) different from the super-AND manner described in FIG. 2. That is, the first analyzer 110 of FIG. 2 may be understood as a component that performs a pretraining step to generate initialization information.

The first CNN 111 may analyze the images IM to extract features. Here, the images IM may include a group of original images and an augmentation group of original images. The augmentation may be understood as additional images generated through horizontal (or vertical) flip, rotation, shifting, scaling, etc. of the original images. Through this augmentation, a data amount for analysis may increase, and the performance of learning and analysis may be improved.

The filter 112 may remove color components of the images IM and may express a boundary of an object clearly. To this end, the filter 112 may include a Sobel filter. The second CNN 113 may analyze Sobel-processed images to extract features. The merger 114 may concatenate an analysis result of the first CNN 111 and an analysis result of the second CNN 113. The merger 114 may output the concatenated features to the fully-connected layer 115.

The fully-connected layer 115 may transform a dimension (or dimensionality) of the concatenated features so as to have a given dimension (or dimensionality). For example, the given dimension may be 128 dimensions. The normalizer 116 may embed the dimension-transformed features to project the dimension-transformed features to an embedding space. As such, similar features may be placed close to each other. For example, the embedding space may be a normalized spherical space.

In training the first model, the dimension-transformed features may be regarded as individual classes and may be separated in the embedding space. The first analyzer 110 may discover the most adjacent neighbor(s) from a feature corresponding to an anchor in the embedding space, may group the discovered neighbor(s) to a sub-class, and may gradually further include features in the sub-class. Here, sub-class information may be used in supervision learning. For example, the first analyzer 110 may adjust a weight of each component of the first model in consideration of an AND (Anchor Neighbourhood Discovery) loss, an augmentation loss, and entropy an loss, and similar images may be placed close to each other in the embedding space depending on the adjusted weight.

The AND loss is defined as a loss caused by distinguishing neighboring pairs from each other. An AND loss LA may be calculated by Equation 1 below.

$$LA = -\sum_{i \in N} \log\left(\sum_{j \in Nk(xi)} \log(P_i^j)\right) - \sum_{i \in N^c} \log(P_i^j) \quad \text{[Equation 1]}$$

Referring to Equation 1, $P_i^j$ indicates the similarity between image i and image j. Nk(xi) is defined as image i discovered as neighboring. N indicates an image(s) selected as a sub-class. According to the above description, a first part of the right side is associated with the probability that an image discovered as neighboring is classified as the same sub-class. A second part of the right side is associated with the probability that an image recognized as a sub-class is absent from the corresponding sub-class.

The augmentation loss may be defined as a loss indicating that features associated with an augmentation group are correctly selected as a sub-class but features associated with a group of original images are incorrectly selected as any other sub-class. The entropy loss may be defined as a loss indicating an entropy of a probability vector indicating the similarity between images. In the entropy loss, the similarity between image i and image i (itself) is not considered.

The first analyzer 110 may calculate a final loss by summing the AND loss, the augmentation loss, and the entropy loss to which a weight is given. The first analyzer 110 may adjust a weight of each component of the first model such that the final loss is minimized. The first model generated (or created) as the learning result may be used in encoding the images IM, that is, in the pretraining. The first model may be used to generate the encoded information EI being the initialization information for image classification of the second analyzer 120.

Figure 3:
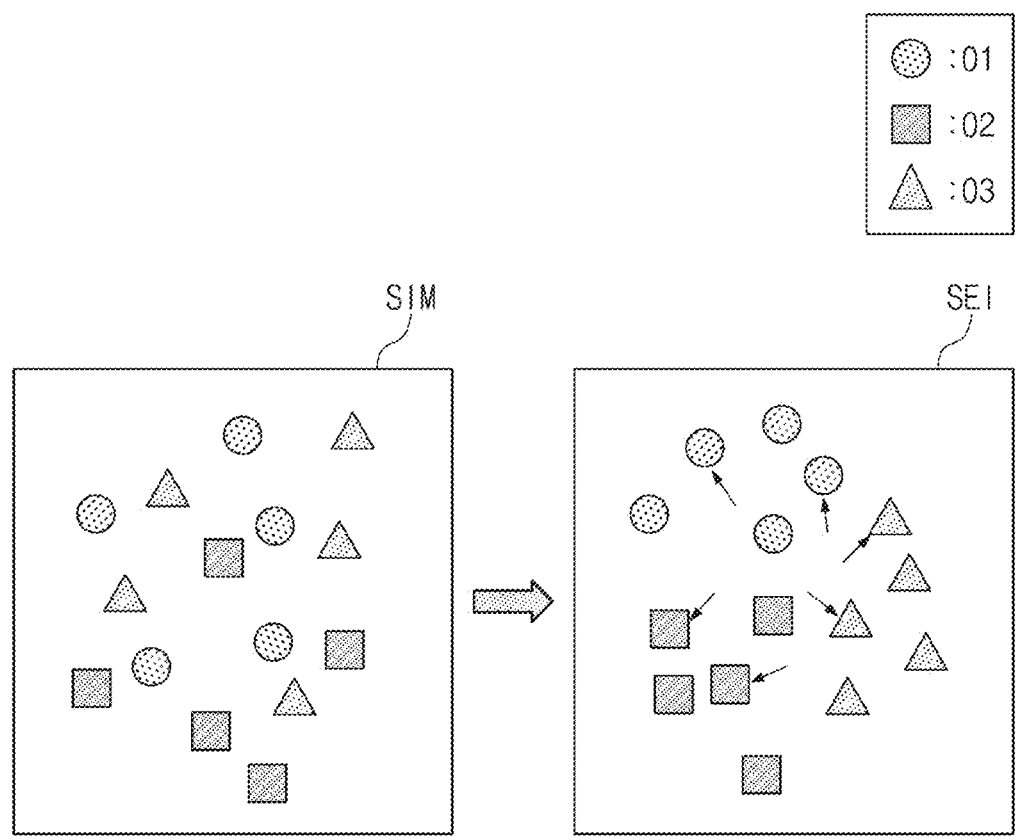
FIG. 3 is a diagram for describing a pretraining process of a first analyzer of FIG. 2, in which features are placed close to each other in an embedding space.

FIG. 3 is a diagram for describing a pretraining process of a first analyzer of FIG. 2, in which features are placed close to each other in an embedding space. Referring to FIG. 3, a first result SIM in which features corresponding to the images IM before encoding of the first analyzer 110 are placed in the embedding space and a second result SEI in which features corresponding to the encoded information EI processed by the encoding are placed in the embedding space are illustrated by way of example. For convenience of description, it is assumed that three different objects O1, O2, and O3 are provided in the images IM.

In an embodiment, by the first analyzer 110 processing the images IM in the pretraining process, which is described with reference to FIG. 2, dimension-transformed features may be regarded as individual classes and thus may be separated in the embedding space like the first result SIM. The first analyzer 110 may discover the most adjacent neighbor from a feature corresponding to an anchor in the embedding space defined by the normalizer 116 of FIG. 2, so as to be grouped to a sub-class. The grouping may be iteratively performed, and thus, the number of features included in a specific sub-class may increase. For example, at least one of features may be selected as an anchor, and the most adjacent features may be grouped based on the selected anchor.

According to the learning of the first analyzer 110, a weight of the first model may be decided such that a weighted sum of the AND loss, the augmentation loss, and the entropy loss is minimized. As a result of minimizing the losses, features corresponding to each of the first to third objects O1, O2, and O3 may be collected in the embedding space like the second result SEI.

Figure 4:
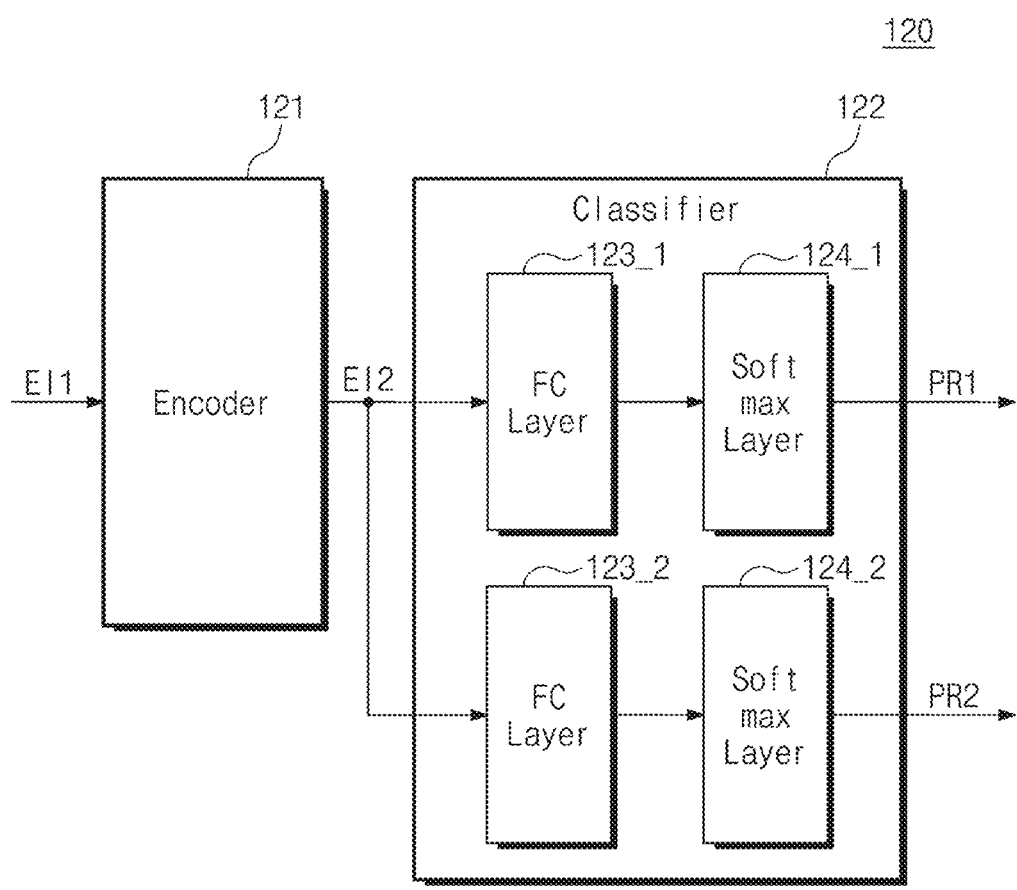
FIG. 4 is a diagram of a second analyzer of FIG. 1.

FIG. 4 is a diagram of a second analyzer of FIG. 1. Referring to FIG. 4, the second analyzer 120 may be implemented with an encoder 121 and a classifier 122. The components illustrated in FIG. 4 may be implemented with a second model performing the encoding described with reference to FIG. 2 and mutual information-based clustering together.

Like the first analyzer 110 described with reference to FIGS. 1 and 2, the encoder 121 may extract features and may generate encoded information about the features through embedding. The encoder 121 may analyze images (e.g., the images IM of FIG. 1), based on first encoded information EI1 output from the first analyzer 110. The encoder 121 may classify features in the embedding space based on the first encoded information EI1 and may generate second encoded information EI2 through the embedding of the classified features. The encoder 121 may generate the second encoded information EI2 such that similar features are placed close to each other in the embedding space.

Like the first analyzer 110 of FIG. 2, the encoder 121 may be implemented with the first CNN 111, the filter 112, the second CNN 113, the merger 114, the fully-connected layer 115, and the normalizer 116. The encoder 121 may be initialized based on the first encoded information EI1 generated by the first analyzer 110. As such, at the encoder 121, initially, features may be separated in the embedding space like the second result SEI of FIG. 3. The encoder 121 may collect features corresponding to the same object more efficiently by grouping the most adjacent neighbors from the features separated in the embedding space by the first analyzer 110.

The classifier 122 may cluster the second encoded information EI2 through the mutual information-based clustering. To this end, the classifier 122 may be implemented with a plurality of fully-connected layers 123_1 and 123_2 and a plurality of Softmax layers 124_1 and 124_2. Each of the plurality of fully-connected layers 123_1 and 123_2 and the plurality of Softmax layers 124_1 and 124_2 may be provided to distinguish a specific object from any other object.

Each of the plurality of fully-connected layers 123_1 and 123_2 may perform clustering such that mutual information between information corresponding to a group of original images and information corresponding to an augmentation group is maximal in the second encoded information EI2. Here, the mutual information is defined as Kullback-Leibler (KL) divergence between a joint distribution of two probability variables and a product of respective marginal distributions of the probability variables. Two probability variables are a probability variable corresponding to an original group and a probability variable corresponding to an augmentation group. The probability variables appear from results of the original group and the augmentation group included in the second encoded information EI2.

Each of the plurality of Softmax layers 124_1 and 124_2 may apply a Softmax function to a result received from the corresponding fully-connected layer among the plurality of fully-connected layers 123_1 and 123_2 such that a sum of output results is "1". The plurality of Softmax layers 124_1 and 124_2 output classification results PR1 and PR2 corresponding to clustered objects. For example, the first classification result PR1 may indicate a result determined as a first object, and the second classification result PR2 may indicate a result determined as a second object.

When the learning of the second model is performed based on the mutual information-based clustering manner, the second analyzer 120 may adjust a weight of each component of the second model in consideration of a mutual information-based clustering loss and a consistency preserving loss. The second analyzer 120 may perform clustering depending on the adjusted weight.

The clustering loss may be calculated based on a joint probability distribution between a probability variable of an original group and a probability variable of an augmentation group. A clustering loss LC may be calculated by Equation 2 below.

$$LC = -\sum_c \sum_{c'} P_{cc'} \cdot \log \frac{P_{cc'}}{P_{c'} \cdot P_c} \quad \text{[Equation 2]}$$

Referring to Equation 2, c indicates a class or an original group, and c' indicates a class of an augmentation group. P is defined as a matrix indicating a joint probability distribution between a probability variable of an original group and a probability variable of an augmentation group. $P_{cc'}$ indicates a joint probability distribution between a probability variable in which a class of an original group is c and a probability variable in which a class of an augmentation group c'. $P_c$ indicates a marginal distribution in which a class of an original group is c, and $P_{c'}$ indicates a marginal distribution in which a class of an original group is c'. As the learning of the second model is made such that the clustering loss is minimized, the second analyzer 120 may perform clustering such that mutual information is maximal.

The consistency preserving loss may be defined as a loss indicating that features associated with an augmentation group are selected as a correct class but features associated with an original group are incorrectly selected as any other class. A consistency preserving loss LR may be calculated by Equation 3 below.

$$LR = -\sum_i \log(Pci^i) - \sum_i \sum_{j \neq i} \log(1 - Pci^j) \quad \text{[Equation 3]}$$

Referring to Expansion 3, $Pci^i$ is defined as a probability of a feature of an augmentation group that is correctly classified as an i class. $Pci^j$ is defined as a probability of a feature of an original group that is incorrectly classified as a j class.

The second analyzer 120 may calculate a final loss by summing the clustering loss and the consistency preserving loss to which a weight is given. The second analyzer 120 may adjust a weight of each component of the second analyzer 120 such that the final loss is minimized. The second model generated (or created) as the learning result may be used in clustering.

Figure 5:
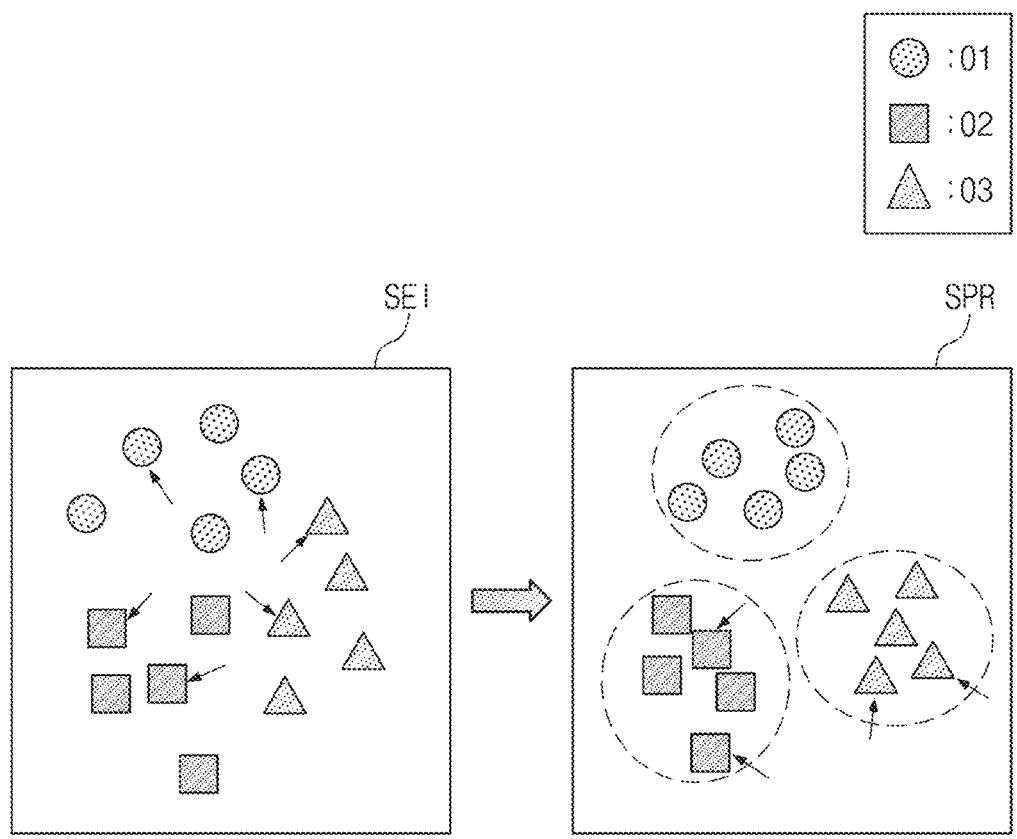
FIG. 5 is a diagram for describing a process of a second analyzer of FIG. 4, in which features are clustered in an embedding space.

FIG. 5 is a diagram for describing a process of a second analyzer of FIG. 4, in which features are clustered in an embedding space. Referring to FIG. 5, a first result SEI in which features corresponding to the first encoded information EI1 processed by the first analyzer 110 are placed in the embedding space and a second result SPR in which features corresponding to the second encoded information EI2 processed by the second analyzer 120 are placed in the embedding space are illustrated by way of example. For convenience of description, it is assumed that three different objects O1, O2, and O3 are provided in the images IM.

The first result SEI may be identical to the second result SEI of FIG. 3. According to the encoding of the first analyzer 110, features may be separated like the first result SEI. In the second analyzer 120, the encoder 121 of FIG. 4 may discover and group neighbors adjacent to an anchor. According to the learning of the second analyzer 120, a weight of the second model may be decided such that a weighted sum of the clustering loss and the consistency preserving loss is minimized. As a result, features corresponding to each of the first to third objects O1, O2, and O3 may be collected like the second result SPR in the embedding space. As such, the accuracy of a clustered result may be improved.

Figure 6:
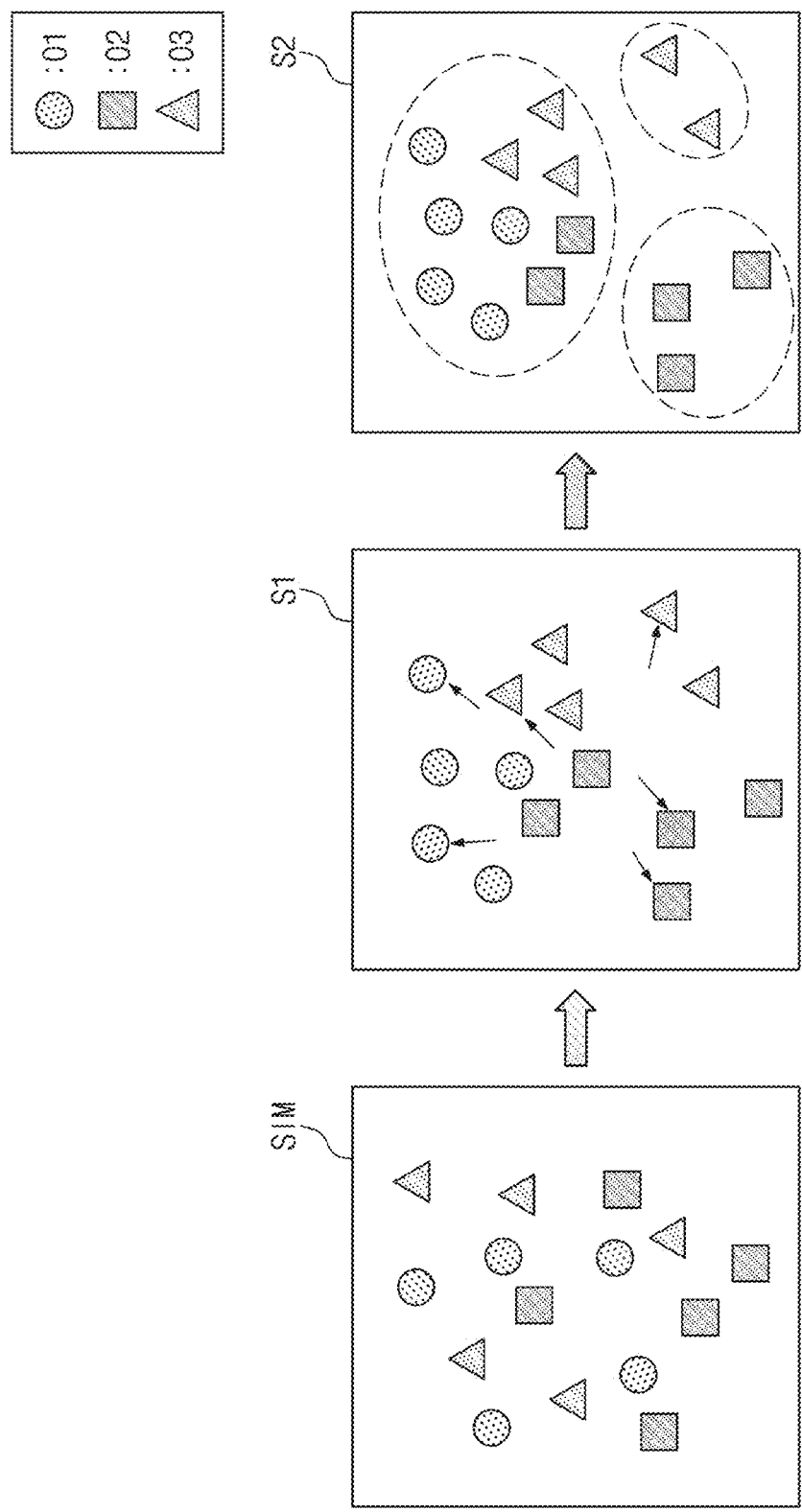
FIG. 6 is a diagram for describing a result obtained when an image analysis system sequentially performs encoding and clustering.

FIG. 6 is a diagram for describing a result obtained when an image analysis system sequentially performs encoding and clustering. Referring to FIG. 6, a first result SIM in which features corresponding to the images IM before encoding are placed in the embedding space, a second result S1 in which features processed by encoding are placed in the embedding space, and a third result S2 of clustering the second result S1 are illustrated by way of example. For convenience of description, it is assumed that three different objects O1, O2, and O3 are provided in the images IM.

Referring to FIG. 6, clustering may be performed after encoding is performed on images once. Unlike FIG. 5, in the second result S1 and the third result S3, the same features are not collected sufficiently. As a result, at least a part of features included in each class may be different from a real object.

Figure 7:
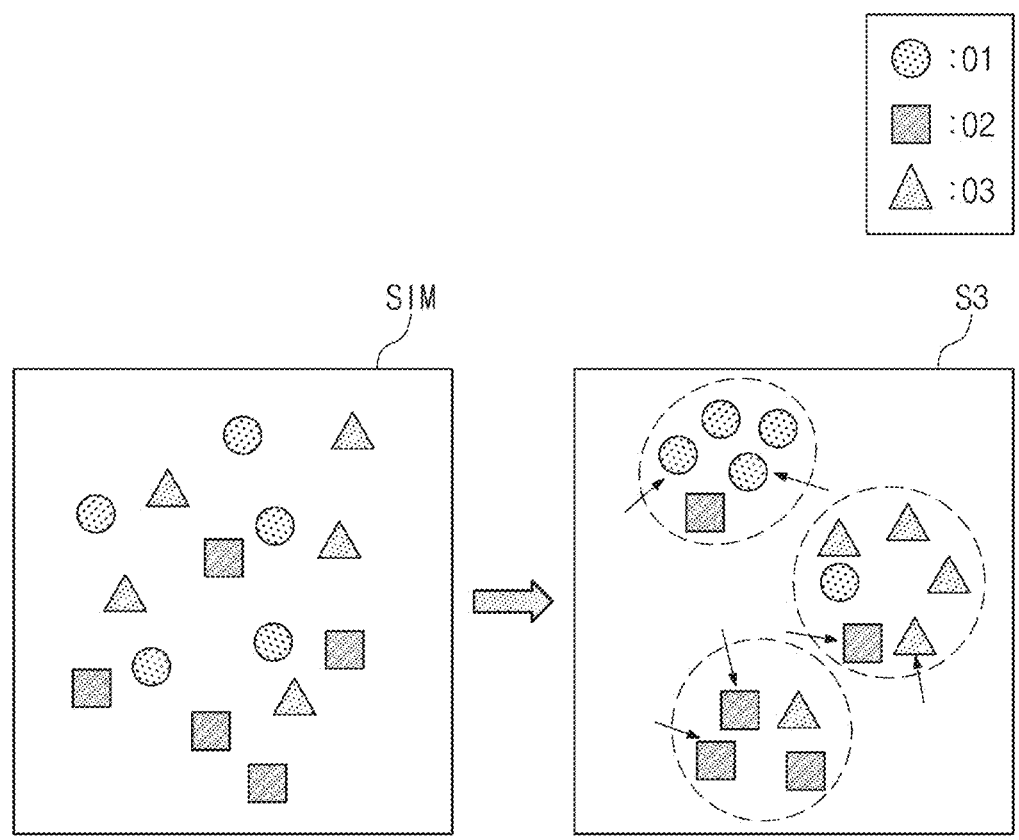
FIG. 7 is a diagram for describing a result obtained when an image analysis system performs encoding and clustering together.

FIG. 7 is a diagram for describing a result obtained when an image analysis system performs encoding and clustering together. Referring to FIG. 7, a first result SIM in which features corresponding to the images IM before encoding are placed in the embedding space and a second result S3 in which features processed by encoding are placed in the embedding space and are then clustered are illustrated by way of example. For convenience of description, it is assumed that three different objects O1, O2, and O3 are provided in the images IM.

Referring to FIG. 7, like the second analyzer 120 of FIG. 1, clustering and encoding may be performed on images together. Unlike FIG. 5, in the second result S3, the same features are not collected sufficiently. As a result, at least a part of features included in each class may be different from a real object.

According to an embodiment of the present disclosure, the image analysis system 100 may sequentially perform encoding (i.e., corresponding to the first analyzer 110) and clustering (i.e., corresponding to the second analyzer 120), and the encoding may be performed once more together with the clustering. As such, the accuracy of clustering of the image analysis system 100 may be further improved.

Figure 8:
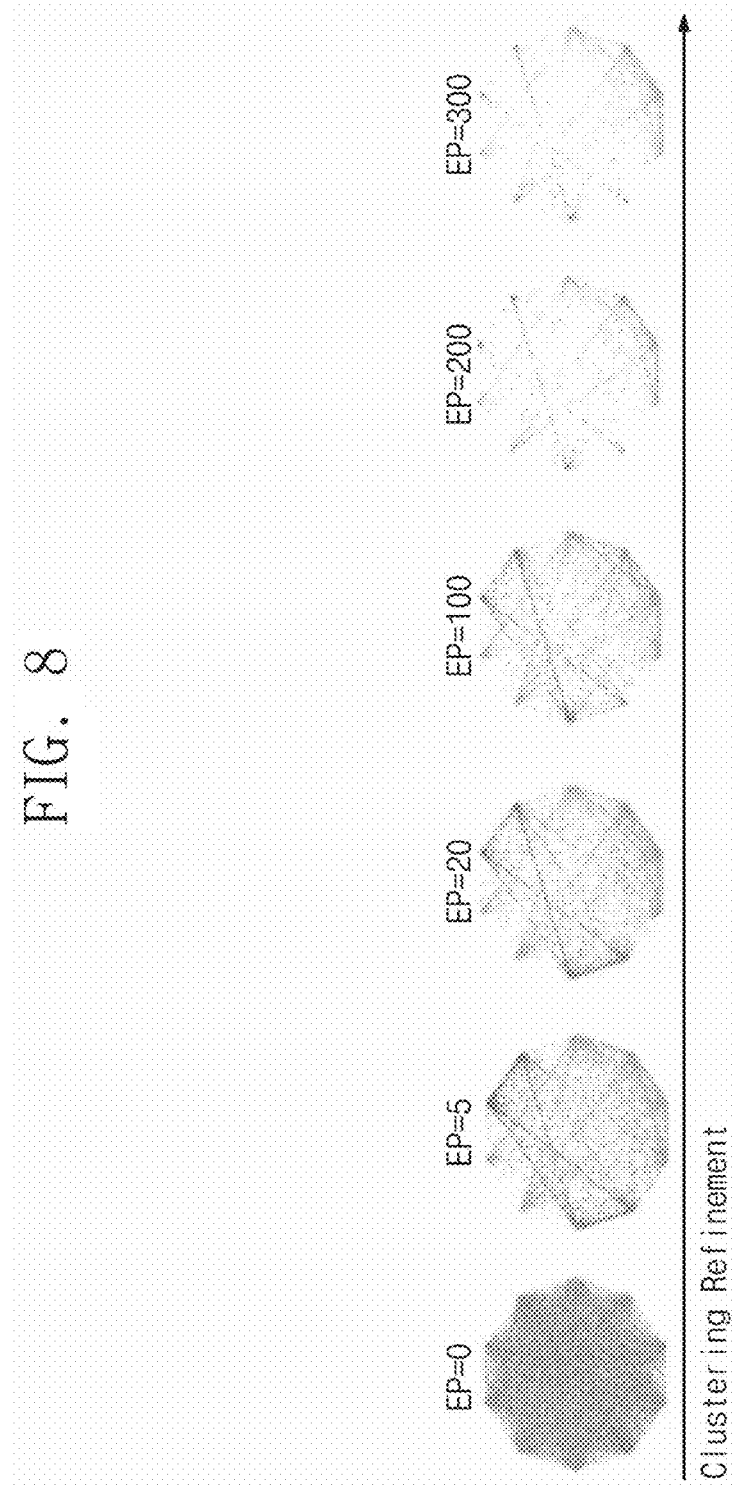
FIG. 8 is a diagram for describing a clustering result of an image analysis system of FIG. 1.

FIG. 8 is a diagram for describing a clustering result of an image analysis system of FIG. 1. Referring to FIG. 8, there is illustrated a distribution of features in the embedding space according to an increase in the number of epochs EP. For each epoch EP, the first analyzer 110 may calculate an AND loss, an augmentation loss, and an entropy loss corresponding to the input images IM and may adjust a weight of the first model such that a final loss decreases. For each epoch EP, the second analyzer 120 may calculate a clustering loss and a consistency preserving loss corresponding to the input images IM and may adjust a weight of the second model such that a final loss decreases.

Referring to FIG. 8, as the number of epochs EP increases, in the embedding space, clustering refinement progresses. For example, as the number of epochs EP increases, features may be collected at 10 vertices. The image analysis system 100 may be understood as separating 10 objects from the images IM in the unsupervised manner in which a label is not given. The image analysis system 100 of the present disclosure may improve the accuracy of clustering without class omission, through the pretraining for generating initialization information of the first analyzer 110 and the mutual information-based clustering performed together with the encoding of the second analyzer 120.

Figure 9:
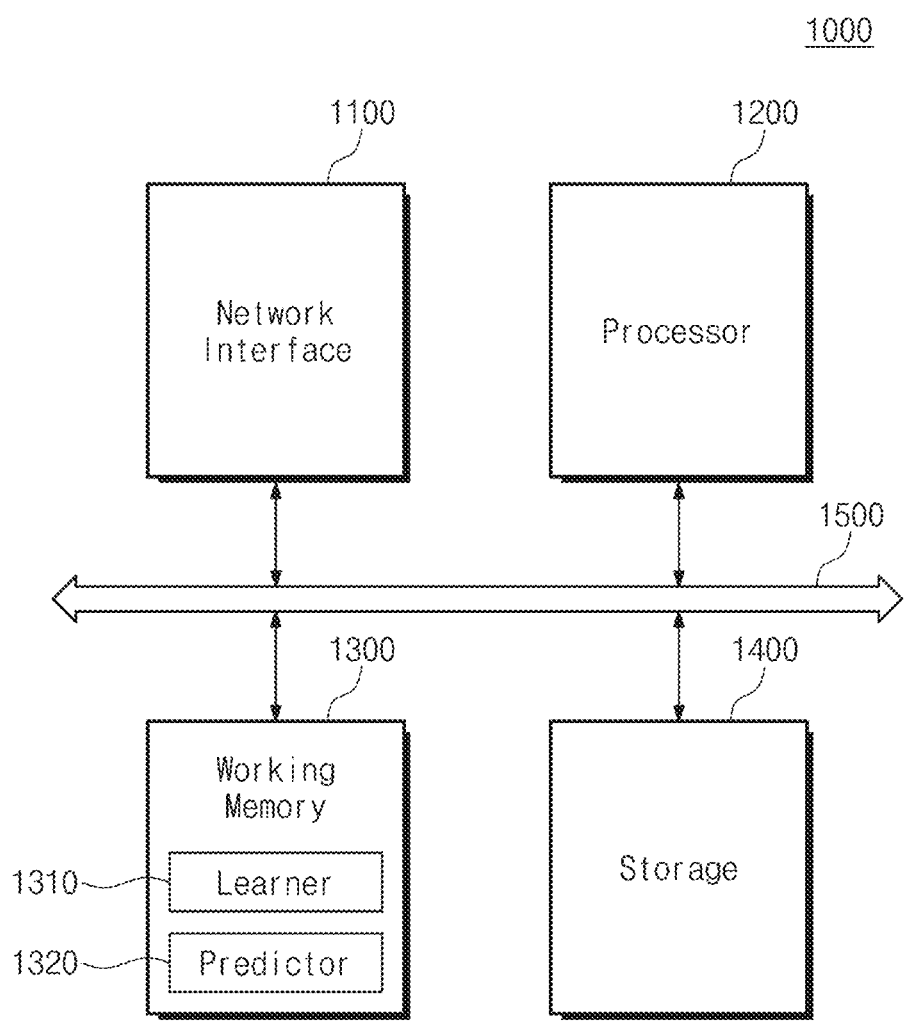
FIG. 9 is a block diagram of an image analysis system of FIG. 1.

FIG. 9 is a block diagram of an image analysis system of FIG. 1. Referring to FIG. 9, an image analysis system 1000 may include a network interface 1100, a processor 1200, a working memory 1300, storage 1400, and a bus 1500.

The network interface 1100 is configured to communicate with external electronic devices. The network interface 1100 may receive images generated from an image sensor or the like and may provide the received images to the processor 1200, the working memory 1300, or the storage 1400 through the bus 1500. The network interface 1100 may transmit, to an external device, a classification result of objects generated by analyzing the images.

The processor 1200 may function as a central processing unit of the image analysis system 1000. The processor 1200 may perform a control operation and a computation/calculation operation that are required for data management, learning, and prediction of the image analysis system 1000. For example, under control of the processor 1200, the network interface 1100 may receive the images. Under control of the processor 1200, the first and second models described above may be trained, and a classification result of objects may be calculated by using the first and second models thus trained. The processor 1200 may operate by utilizing a computation/calculation space of the working memory 1300 and may read files for driving an operating system and execution files of applications from the storage 1400. The processor 1200 may execute the operating system and the applications.

The working memory 1300 may store data and program codes that are processed by the processor 1200 or are scheduled to be processed by the processor 1200. For example, the working memory 1300 may store images, pieces of information for training an analysis model, pieces of information for encoding the images, pieces of information for performing clustering, and pieces of information for building the analysis model. The working memory 1300 may be used as a main memory of the image analysis system 1000. The working memory 1300 may include a dynamic random access memory (DRAM), a static RAM (SRAM), a phase-change RAM (PRAM), a magnetic RAM (MRAM), a ferroelectric RAM (FeRAM), a resistive RAM (RRAM), etc.

A learner 1310 and a predictor 1320 may be loaded and executed onto the working memory 1300. The learner 1310 and the predictor 1320 may be a portion of a computation/calculation space of the working memory 1300. In this case, the learner 1310 and the predictor 1320 may be implemented in the form of firmware or software. For example, the firmware may be stored in the storage 1400 and may be loaded onto the working memory 1300 in executing the firmware. The processor 1200 may execute the firmware loaded onto the working memory 1300.

The learner 1310 may train the first model for pretraining (i.e., encoding) of the first analyzer 110 and the second model for performing clustering together with the encoding of the second analyzer 120. The learner 1310 may calculate an AND loss, an augmentation loss, and an entropy loss depending on an image analysis of the first model. The learner 1310 may adjust a weight of the first model such that there decreases a final loss corresponding to a sum of the AND loss, the augmentation loss, and the entropy loss to which a weight is given. The learner 1310 may calculate a clustering loss and a consistency preserving loss depending on an image analysis of the second model. The learner 1310 may adjust a weight of the second model such that there decreases a final loss corresponding to a sum of the clustering loss and the consistency preserving loss to which a weight is given.

The predictor 1320 may generate a classification result of images based on the first model and the second model trained by the learner 1310. For example, the predictor 1320 may perform pretraining (i.e., encoding) of a super-AND manner on the input images by using the first model. The predictor 1320 may perform the mutual information-based clustering and the encoding on the images together, by using the second model.

The storage 1400 may store data generated for the purpose of long-time storage by the operating system or the applications, files for driving the operating system, execution files of the applications, etc. For example, the storage 1400 may store files for execution of the learner 1310 and the predictor 1320. The storage 1400 may be used as an auxiliary storage device of the image analysis system 1000. The storage 1400 may include a flash memory, a PRAM, an MRAM, a FeRAM, an RRAM, etc.

The bus 1500 may provide a communication path between the components of the image analysis system 1000. The network interface 1100, the processor 1200, the working memory 1300, and the storage 1400 may exchange data with each other through the bus 1500. The bus 1500 may be configured to support various communication formats used in the image analysis system 1000.

According to an embodiment of the present disclosure, an image analysis system and an operating method thereof may improve the accuracy of object classification through a first step of performing embedding and a second step of performing embedding and clustering.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image analysis system comprising:
a memory configured to store data and program codes; and
a processor configured to process the data and the program codes stored in the memory to
generate first features by encoding images through a first model and to adjust a weight of the first model based on the first features, and
generate second features based on the first features by encoding the images through a second model, to respectively classify the second features into classes, and to adjust a weight of the second model based on mutual information and a correlation between a first class among the classes which features corresponding to an original image group from among the second features are classified as and a second class among the classes which features corresponding to an augmentation group of the original image group from among the second features are classified as,
wherein the processor is further configured to
calculate a first probability that a feature being the most neighboring to a target feature from among the first features is classified as a sub-class and a second probability that the target feature is absent from the sub-class, based on a similarity between features corresponding to the original image group from among the first features and features corresponding to the augmentation group from among the first features, and
adjust the weight of the first model based on the first probability and the second probability.

2. The image analysis system of claim 1, wherein the processor is further configured to group a feature being the closest in value to a target feature from among the first features based on the first model whose weight is adjusted.

3. The image analysis system of claim 2, wherein the processor is further configured to transform the feature being the closest in value to the target feature so as to be close in distance to the target feature in an embedding space.

4. The image analysis system of claim 1, wherein the processor is configured to generate the first features by extracting features from the images, reducing a dimension of the features to a given dimension, and normalizing the dimension-reduced features to an embedding space.

5. The image analysis system of claim 1, wherein the processor is further configured to:
transform a feature being the most neighboring in value to a target feature from among the second features based on the second model whose weight is adjusted, so as to be close in distance to the target feature; and
classify the transformed features into the classes.

6. The image analysis system of claim 1, wherein the processor is further configured to decide an initial value for calculating the second features based on the first features.

7. The image analysis system of claim 1, wherein the processor is configured to generate the second features by extracting features from the images, reducing a dimension of the features to a given dimension, and normalizing the dimension-reduced features to an embedding space based on the first features.

8. The image analysis system of claim 1, wherein the processor is further configured to:
calculate a first probability variable of the first class and a second probability variable of the second class;
calculate a clustering loss based on a joint probability distribution between the first and second probability variables; and
adjust the weight of the second model based on the clustering loss such that the mutual information increases.

9. The image analysis system of claim 1, wherein the processor is further configured to:
calculate a first probability that a target feature among the features corresponding to the augmentation group is classified as a target class and a second probability that a feature corresponding to the target feature from among the features corresponding to the original image group is not classified as the target class; and
adjust the weight of the second model based on the first probability and the second probability.

10. The image analysis system of claim 1, wherein the processor is further configured to:
calculate a first loss based on the mutual information;
calculate a second loss based on the correlation; and
adjust the weight of the second model such that a sum of the first loss and the second loss to which a weight is given.

11. The image analysis system of claim 1, wherein a label is not given to the images.

12. An operating method of an image analysis system, the method comprising:
generating first features by encoding original images through a first model;
generating second features by encoding augmentation images of the original images through the first model;
adjusting a weight of the first model based on the first features and the second features;
generating third features by encoding the original images through a second model based on the first features;
generate fourth features by encoding the augmentation images through the second model based on the second features;
clustering the third and fourth features; and
adjusting a weight of the second model based on mutual information and a correlation between the third and fourth features thus clustered,
wherein the adjusting of the weight of the first model includes deciding an initial value for generating the third features and the fourth features based on the first features and the second features.

13. The method of claim 12, wherein the generating of the first features or the generating of the second features includes:
extracting features from the original images or the augmentation images;
reducing a dimension of the extracted features to a given dimension; and
normalizing the dimension-reduced features to an embedding space.

14. The method of claim 12, wherein the generating of the third features or the generating of the fourth features includes:
extracting features from the original images or the augmentation images;
reducing a dimension of the extracted features to a given dimension; and
normalizing the dimension-reduced features to an embedding space based on the first and second features.

15. The method of claim 12, wherein the adjusting of the weight of the second model includes:
calculating a first loss based on a joint probability distribution between a first probability variable of a first class which each of the third features is classified as and a second probability variable of a second class which each of the fourth features is classified as;
calculating a second loss according to an event that a third feature and a fourth feature corresponding to each other from among the third features and the fourth features are classified into different classes, based on the correlation between the third and fourth features thus clustered; and
adjusting the weight of the second model such that a weighted sum of the first loss and the second loss decreases.

* * * * *